United States Patent [19]

Elderbaum

[11] 4,008,514
[45] Feb. 22, 1977

[54] METHOD OF MAKING CERAMIC CAPACITOR

[76] Inventor: Gilbert J. Elderbaum, 896 Main St., Lynnfield Center, Mass. 01940

[22] Filed: May 5, 1975

[21] Appl. No.: 574,589

Related U.S. Application Data

[63] Continuation-in-part of Ser. No. 359,229, May 11, 1973, Pat. No. 3,882,059.

[52] U.S. Cl. .................... 29/25.42; 361/272
[51] Int. Cl.[2] .............. H01G 4/12; H01G 4/30
[58] Field of Search ............ 29/25.42; 264/61, 67; 317/261

[56] References Cited

UNITED STATES PATENTS

| | | | |
|---|---|---|---|
| 2,531,389 | 11/1950 | Brandt | 29/25.42 |
| 3,021,589 | 2/1962 | Weller | 29/25.42 |
| 3,235,939 | 2/1966 | Rodriquez | 29/25.42 |
| 3,236,707 | 2/1966 | Lins | 29/25.42 UX |
| 3,466,513 | 9/1969 | Belko, Jr. et al. | 317/261 |
| 3,604,082 | 9/1971 | McBrayer et al. | 29/25.42 |
| 3,815,187 | 6/1974 | Hanold | 29/25.42 |

Primary Examiner—Carl E. Hall

[57] ABSTRACT

A capacitor and method of making the same with a very thin dielectric separation of electrodes where a first pattern of a multiplicity of electrodes is defined on a release surface, a very thin layer of ceramic greenware of a thickness incapable of normal handling is cast on the pattern, a second pattern of a multiplicity of electrodes is defined on the other side of the thin strip, a backing layer of a thicker strip of ceramic greenware is placed on and adhered to the thin strip, the two strip assembly is removed and may be stacked with others, a second backing layer is then applied over the exposed electrode pattern, the assembly is then pressure-laminated and cured. The formed capacitors may be separated before or after firing.

10 Claims, 6 Drawing Figures

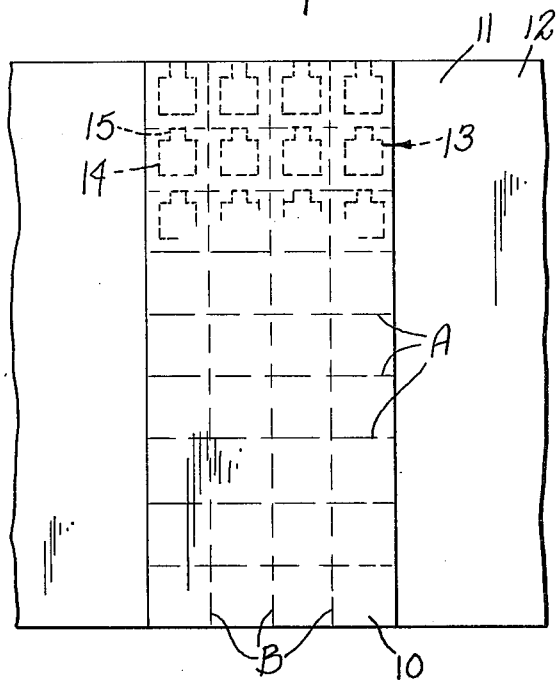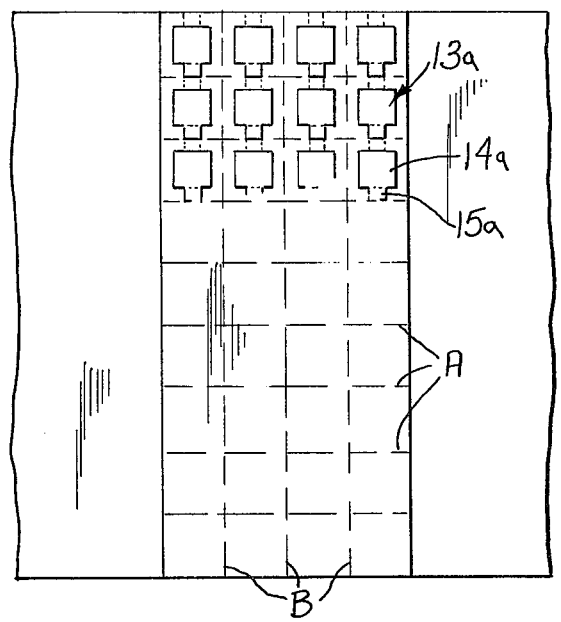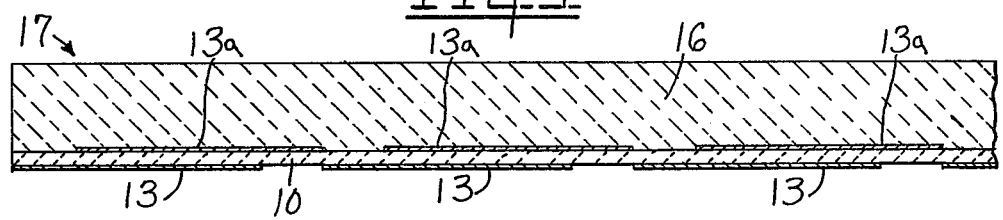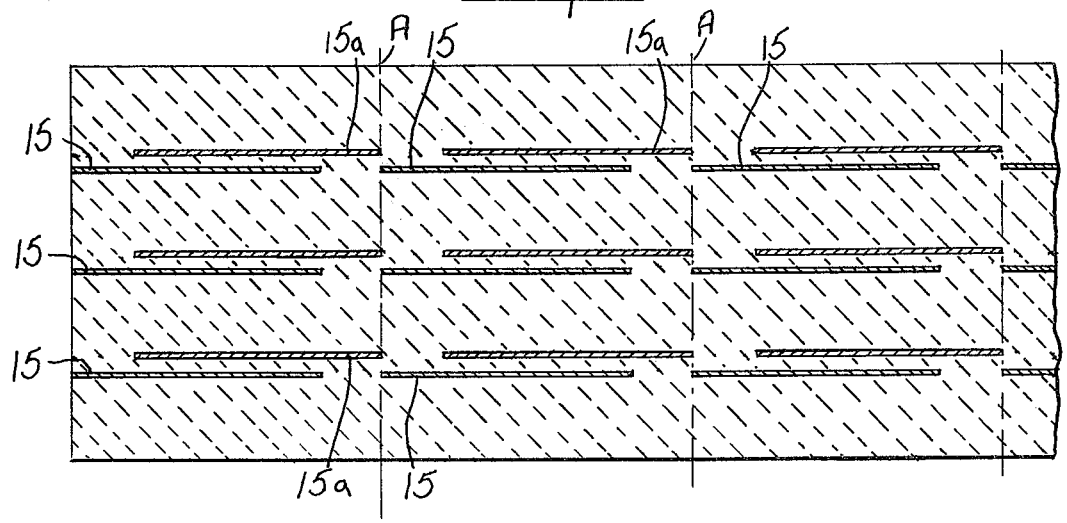

METHOD OF MAKING CERAMIC CAPACITOR

This application is a continuation-in-part of application Ser. No. 359,229 filed May 11, 1973, now U.S. Pat. No. 3,882,059.

This invention relates to capacitors and an improved method of making the same, and more particularly relates to the making of capacitors of higher capacitance value.

It is well known that the capacitance value of a capacitor varies as a function of the area of facing surfaces of capacitor electrodes and the spacing therebetween, as well as other factors such as dielectric constants. The capacitance may be increased by decreasing the spacing between electrodes. However, in the case of ceramic capacitors a problem is presented in the handling of sheets or strips of ceramic greenware when the thickness decreases below 0.001 inch.

Thin sheets of ceramic greenware when fired quickly distort at the edges. Stripping of thin ceramic greenware film from the base on which the film is cast is a difficult and delicate operation as there is a tendency for the thin greenware film to tear and to fold over upon itself.

The present invention overcomes these difficulties by providing a new and improved method of making capacitors utilizing very thin ceramic dielectric. The present invention provides a capacitor of increased capacitance value through thinner dielectric separation.

Briefly stated, the invention in one form thereof, comprises the steps of defining a first pattern of electrodes on a release surface, casting a very thin layer of a ceramic on said release surface over said patterns, applying a second pattern of electrodes on the top or other side of the thin film of ceramic, then positioning a thicker layer of green ceramic on top of the cast film, applying sufficient pressure to at least partially consolidate the surfaces of the strips of ceramic, and removing both strips of ceramic from the release surface. If a single layer capacitor is desired, then a second cover strip is applied over the exposed electrode pattern. If multi-layer capacitors are desired, the assembly of the very thin strip and the backing strip may be stacked to the desired thickness. Thereafter, the assembly may be pressure laminated. Individual capacitors are then cut from the assembly, or one surface may be scored along the edges of the electrodes to permit later separation of capacitors from a multiple fired assembly.

An object of this invention is to provide a new and improved method of making ceramic capacitors.

A further object of this invention is to provide a new and improved method of making capacitors of greater capacitance value.

A further object of this invention is to provide a new and improved multi-layer capacitor and method of making the same.

The features of the invention which are believed to be novel are particularly pointed out and distinctly claimed in the concluding portion of this specification. The invention, however, both as to its organization, operation and practice, together with further objects and advantages thereof, may best be appreciated by reference to the following detailed description taken in conjunction with the drawings wherein:

FIG. 1 is a view of a strip of ceramic greenware cast over an electrode pattern on a release surface;

FIG. 2 is a view similar to FIG. 1 but with an electrode pattern defined on the upper surface;

FIG. 3 is a longitudinal half-section view of the ceramic strips of FIGS. 1 and 2 with a backing and support sheet attached thereto;

FIG. 4 is a view in half-section of an assembly of a stack of the assemblies of FIG. 3 to make a multilayer capacitor;

Figure 5:
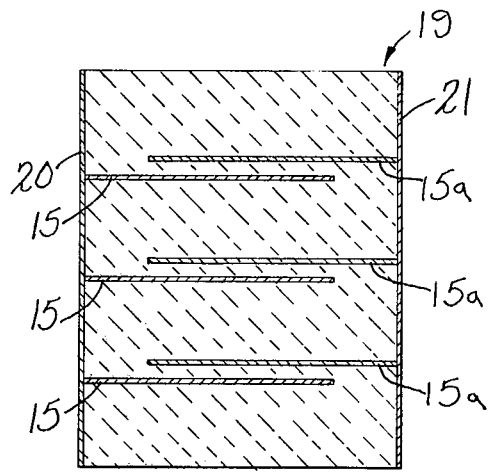
FIG. 5 is a view in half-section of a completed capacitor made in accordance with the invention.

FIG. 1 illustrates a strip of ceramic greenware 10 which has been deposited on a surface 11 of a member 12. Surface 11 has defined thereon a releasable pattern of a plurality of electrodes 13. Each of the electrodes 13 comprises an electrode pattern 14 and a lead or tab portion 15.

The ceramic strips 10 are slip-cast to a desired thickness from a mixture comprising ceramic particles, plasticizer, binder and solvent. In one example, the ceramic may be lead barium niobate (PBN) mixed with liquid methylmethacrylate and Monsanto Chemical Company No. 160 Santicizer (plastizer) and an ethylene dichloride solvent. The resultant mixture is slip-cast to the desired thickness and dries very quickly on the surface 11.

The mixture may be ceramic 40–70 percent, binder 20–50 percent, plasticizer 1–4 percent; and solvent 10–20 percent. The mixture is blended and then cast.

Prior to casting the strip 10 the conductive patterns are defined on surface 11 in any suitable manner. One technique is to utilize a screening process wherein conductive material in a liquid vehicle is screened or squeezed through a screening pattern. A suitable substance for this process is quick-film conductor ink No. MB-1 - 169 of Matthey Bishop, Inc. Melvern, Pa., which contains a gold, palladium and platinum in a thick liquid binder. The surface 11 may be defined on Mylar which has been coated with a release agent such as a fluorocarbon. Surface 11 may also be defined on glass coated with a release agent prior to definition of the electrode pattern. A release paper with the electrode pattern thereon may also be utilized.

In accordance with the invention, the ceramic strip is made very thin to decrease the dielectric value thereof with increase in the capacitance of the resulting capacitor. The ceramic strip 10 may be slip-cast by the well-known doctor blade technique to a desired thickness over the pattern of electrodes defined on the surface 11.

In practice, the ceramic strip may be as thin as 0.0001 inch, a thickness which is normally incapable of being handled without distortion, tearing, wrinkling, etc. in the ceramic greenware state.

Optionally, a light source may be positioned beneath member 12 which is transparent, or at least translucent.

The greenware strip 10, due to its very minimal thickness, is translucent and the source of light beneath surface 11 illuminates the pattern through the greenware strip. While the greenware strip is still on surface 11 and while it is in its initial drying stage, patterns 13a comprising an electrode portion 14a and a tab portion 15a are defined on the upper surface of the strip 10 as, for example, by silk screening. The major electrode patterns 14a are directly over and in registry with the patterns 14, the only difference being that the tabs 15a extend in the opposite direction from the tabs 15

The broken lines A and B in FIGS. 1 and 2 represent future cut or score lines by which individual capacitors will be defined. A thicker piece of ceramic greenware of substantially the same size as strip 10 is placed over strip 10. This strip 16 is one of sufficient thickness that may be handled without wrinkling, distortion, tearing, etc. and may be on the order of 0.001 inch. Strip 16 has sufficient pressure exerted thereon so that it will adhere to strip 10. Then, upon adherence of strip 16 to strip 10 both pieces may be removed from the surface 11 without distortion, tearing or wrinkling. Either before or after removal of the assembly from the surface, the strip 10 may be trimmed on the edges, if necessary.

Thereafter, the assemblies 17 of the strips 10 with patterns 13 and 13a on both sides thereof together with the strip 16 may be stacked in multiple to a desired thickness.

A multiplicity of the assemblies 17 as shown in FIG. 3 may be stacked and pressure consolidated as by lamination as exemplified in FIG. 4. Preferably a plurality of assemblies 17 may be laminated at a pressure of 2,000 psi and a temperature of 120° F. After this pressure consolidation the strips may be cut into individual multiple layer capacitors as exemplified along the lines A and B in FIG. 2, then each individual capacitor fired separately.

As exemplified by the cut lines A in FIG. 4, the cut lines A will coincide with the ends of the tabs 15 and 15a. The cut lines are exemplifed in dotted lines in FIGS. 1 and 2 coinciding in the lateral direction with the ends of the tabs 15 and 15a.

Preferably the defined lateral cut lines A and the longitudinal cut lines B are such that a border is defined around the conductive patterns 14 and 14a.

After cutting, the individual capacitors are placed on a kiln tray and fired in an oven which may be of the type where the tray moves continuously therethrough. Generally an entrance-to-exit time of six hours is provided and the capacitors are exposed to a temperature of 2300° F. for approximately one hour. The time and temperature may vary in accordance with various types of ceramics which may be used and the thickness of the capacitors. Upon firing or sintering the organic constituents of the green ceramic strips volatilize, and the ceramics become a monolithic structure. During the firing the binder of the electrodes is driven off.

After firing and separation along lines A and B individual capacitors 19, FIG. 5, are defined. A metallic coating 20 is applied to connect all of tabs 15 and a second metallic coating 21 connects all of tabs 15a.

In an alternate embodiment of the invention the strip 10 is first cast on the surface 11 without the electrode patterns being defined on the release surface. Then the patterns 13a are defined on the thinly cast strip 10, the backing strip 16 is applied and at least partially adhered to the strip 10; thereafter, both strips are removed from the release surface and the patterns 13 are applied to the underside of strip 10 after removal from surface 11. Thereafter, the assemblies are pressure-consolidated as previously described to the desired thickness fired, and individual capacitors separated and metallized.

It will be understood that the method of manufacture is applicable to single layer capacitors as well as multiple layer. For example, in the assembly of FIG. 3 a single layer may be made merely by disposing a second strip 16 on the underside of strip 10. In this case the green capacitor assembly may be prescored along lines A and B, and individual capacitors snapped from the assembly after firing as disclosed in U.S. Pat. No. 3,882,059.

Figure 6:
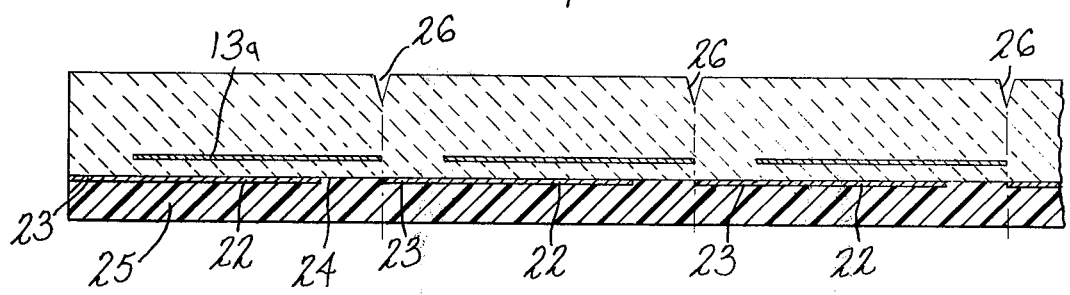
FIG. 6 is a view in half-section of an assembly of single layer capacitors made in accordance with the invention.

In another embodiment of the invention, only the patterns 13a are defined on strip 10, the backing strip is applied, the assembly laminated and then fired with electrodes on one side as shown in FIG. 6. After firing, electrodes 22 with tabs 23 are applied to lower surface 24. The electrodes 22 may be of aluminum, copper or silver since the ceramic has already been cured and the noble metal mixture is not required to withstand the high curing temperatures. Then an insulating layer 25 of plastic may be applied over electrodes 22.

In FIG. 6, scores 26 are made in a grid-like pattern corresponding to lines A and B (FIG. 2) prior to firing. After the final assembly, individual capacitors are broken from the assembly as previously explained.

In all of the embodiments disclosed a separation layer of ceramic is provided of a minimal thickness which is not capable of handling in a greenware state, but which provides a minimal separation of electrodes and thus increases the capacitance value of the individual capacitors.

The thickness of the various capacitor assemblies have been exaggerated for purposes of illustration. The assembly of FIG. 4, for example, may be only about 0.0043 inch for a three layer capacitor.

Score lines may be defined in any of the assemblies shown along the defining lines A and B. Such scoring may be accomplished by a grid-like die, a plurality of knife edges or other suitable means. The depth of the scoring is about 10–12 percent of the final thickness of the fired ceramic. The force required to snap off a row or column of capacitors along a scored line A or B will be in the range of 8,000 – 25,000 psi. This pressure in pounds per square inch may seen high, but the area involved is extremely small.

While connection leads or tabs 15 and 15a have been exemplified, the entire electrodes may be continued to the lines A, if desired.

It may thus be seen that the objects of the invention set forth as well as those made apparent from the foregoing description are efficiently attained. While several embodiments of the invention have been set forth for purposes of disclosure, modification to the disclosed embodiments of the invention as well as other embodiments thereof may occur to those skilled in the art. Accordingly, the appended claims are intended to cover all embodiments which do not depart from the spirit and scope of the invention.

What is claimed is:

1. A method of making capacitors in multiple which comprises defining a first pattern of a multiplicity of electrodes on a release surface, casting a thin first strip of ceramic greenware over said release surface, defining a second pattern of a multiplicity of electrodes on said strip in registry with the electrodes of said first pattern, adhering a first backing strip of ceramic greenware of greater thickness than said first strip to said first strip, removing said strips from said surface with said first pattern thereon, covering the first pattern of said first strip with a second backing strip of ceramic greenware, laminating said strips, cutting individual capacitor units including electrodes in registry on either side of said first strip from the laminated assembly and curing the units.

2. The method of claim 1 comprising the further step of stacking a plurality of assemblies of said first strip and said first backing strip prior to applying said second backing strip.

3. The method of claim 2 comprising the further step of metalizing edges of the capacitor units to connect the first pattern electrodes together and to connect the second pattern electrodes together.

4. The method of claim 1 wherein the laminated strips are cured prior to cutting individual capacitor units therefrom.

5. A method of making capacitors which comprises defining a first multiplicity of electrode patterns on a release surface, casting a thin layer of ceramic greenware over said release surface and said patterns, defining a second multiplicity of electrode patterns on the other side of said thin layer in registry with said first multiplicity of patterns, positioning a backing strip of ceramic greenware of greater thickness than said first strip on said first strip and adhering to said first strip, to provide a two-strip assembly, removing said assembly from said release surface, stacking a plurality of said assemblies with the electrode patterns of each assembly in registry, applying a cover strip to the remaining uncovered pattern, pressure consolidating said stack, curing said stack to a homogeneous ceramic, and thereafter separating individual capacitors from the cured assembly.

6. The method of claim 5 comprising the further step of scoring the consolidated stack along lines coinciding with edges of the patterns prior to curing.

7. A method of making capacitors which comprises casting a thin strip of ceramic greenware on a surface, defining a first multiplicity of electrode patterns on said thin strip, positioning a backing strip of ceramic greenware of greater thickness than said thin strip on said thin strip and adhering thereto to form a two-strip assembly, removing said two strip assembly from said surface, defining a second multiplicity of electrode patterns on the other side of said thin strip in registry with the electrodes of said first pattern, applying a second backing strip to said thin strip over said second pattern, laminating said strips, curing said ceramic, and separating individual capacitors from the cured assembly.

8. The method of claim 7 comprising the further step of stacking a plurality of said two strip assemblies with the patterns thereof in registry prior to laminating.

9. A method of making capacitors which comprises casting a thin strip of ceramic greenware on a surface, defining a first pattern of a multiplicity of electrodes on said thin strip, positioning a backing strip of ceramic greenware of greater thickness than said thin strip on said thin strip over said electrodes and adhering thereto to provide a two-strip assembly, removing said two strip assembly from said surface, curing said assembly, placing a pattern of a second multiplicity of electrodes on the thin strip side of said cured assembly in registry with the electrodes of said first multiplicity, and separating individual electrodes from said assembly.

10. The method of claim 9 wherein the first multiplicity of electrodes are of metal which will withstand the heat of curing the ceramic, and the second multiplicity of electrodes are of less noble metal.

* * * * *